United States Patent [19]

Filo

[11] Patent Number: 5,068,739
[45] Date of Patent: Nov. 26, 1991

[54] METHOD TO IMAGE TRANSPARENT MEDIA UTILIZING INTEGRATED SCANNING

[75] Inventor: Andrew Filo, Cupertino, Calif.

[73] Assignee: Optum Corporation, Cupertino, Calif.

[21] Appl. No.: 309,099

[22] Filed: Feb. 10, 1989

[51] Int. Cl.$^5$ .................... H04N 5/74; H04N 7/18; G03F 3/10
[52] U.S. Cl. .................... 358/237; 358/76; 358/104; 356/236
[58] Field of Search .................... 358/76, 237, 104; 355/22; 356/236; 340/703

[56] References Cited

U.S. PATENT DOCUMENTS

| | | | |
|---|---|---|---|
| 3,131,247 | 4/1964 | Benamy et al. | 358/104 |
| 4,462,042 | 7/1984 | Reymond et al. | 358/76 |
| 4,706,199 | 11/1987 | Guerin | 340/703 |
| 4,785,336 | 11/1988 | McComb et al. | 356/236 |

Primary Examiner—John K. Peng
Attorney, Agent, or Firm—Keith Kline

[57] ABSTRACT

An electro-optical technique for the efficient scanning of many different forms of transparent media. The method utilizes synchronous closed loop scanning (integrated scanning). The subject is illuminated with a predetermined light source level. The source is directed by a scanner to the transparent media. The illumination is then electro-optically processed and immediately fed back through the same scanner to the subject media. The resulting feedback creates an image signal that actively illuminates the media, providing only as much light as is required to detect the image. The signal thus created can be used to create a very high resolution reproduction of the subject image. The image can be reproduced immediately for viewing and transmission or stored as a video record. In addition, the image can be manipulated or integrated with other images for analysis, measurement, or presentation purposes. Embodiments of the present invention include film negative and fiche scanners, microscopes, transparency scanners, and computer accessories.

21 Claims, 19 Drawing Sheets

METHOD TO IMAGE TRANSPARENT MEDIA UTILIZING INTEGRATED SCANNING

FIELD OF THE INVENTION

The present invention is related to the field of transparent media imaging devices, and more specifically, is a method to image transparent media utilizing integrated scanning. This invention relates to applicant's pending application for an Integrated Scanning Imaging System, Ser. No. 169,791, which is incorporated by reference in its entirety.

BACKGROUND OF THE INVENTION

The present invention is directed toward transparent media imaging devices utilizing an integrated scanning imaging system, i.e., a system by which an object is simultaneously imaged and reproduced by the system.

Scanning systems have the function of imaging objects or reproducing images of the objects on a medium. "Scanning" refers to the typical point-by-point method by which an object is imaged and/or an image reproduced. A common example of a scanning system which is used to reproduce images is television. A television set uses a raster scan technique for creating images on the screen of a cathode ray tube.

In general, the organization of a scanning imaging system has a radiation source element which directs radiation toward the subject object, a detector element which receives the radiation reflected by the object and converts the radiation into electrical signals, an element for processing the electrical signals, and an imaging element for converting the processed signals into a reproduced image of the object.

The use of the unique integrated scanning system disclosed in the inventor's pending application, an Integrated Scanning Imaging System, Ser. No. 169,791, allows many imaging devices currently in use to be vastly improved upon.

Imaging systems currently in use require specialized hardware. If the system needs a high degree of resolution, precision optical hardware—lenses, fiber optics or the like—is required. Even low resolution systems require a good deal of space to accommodate the necessary hardware.

Accordingly, problems inherent in current art imaging systems are that the devices are bulky, require precision hardware, and are costly to manufacture.

SUMMARY OF THE INVENTION

Accordingly, the present invention provides for transparent media imaging devices utilizing an integrated scanning imaging system. The present invention uses real time feedback to create a high resolution reproduction of the image. Because the scanning and display of the image can be performed without storage of the signal in memory, a great savings in operation time is realized. Further, since the feedback controls the resolution instead of being dependent the pixel geometry of an imaging array (picture elements), the present invention can be used to create near studio quality video at a very low cost.

The savings in operation time is of paramount importance to the embodiments disclosed herein. If digital video methods were used, e.g. storing the image in a computer for transmitted display, the response time would simply be too slow. A computer based system would have to operate at on the order of 10,000 mHz to perform the function of the present invention. The present invention scans 60 screens per second with a screen composed of a 748×480 dot raster, requiring the scanning of 21,542,400 dots/sec. Each dot is exposed to four sensors—red, green, blue, and luminance—with 256 levels of grey scale possible. Thus, 21,542,400×4×256 =22,059,417,000 operations per second.) Therefore, a simultaneous image display with high resolution would not be economically feasible without the integrated scanning of the present invention.

The present invention has a scanning CRT which emits light through a transparency. The emitted light is sensed and processed into a standard NTSC (National Television Standards Committee) video signal which is fed back to the scanning CRT. The feedback allows the scanning CRT to adjust the amount of light emitted so that light areas of the image are not saturated with light and washed out, and dark areas are exposed to enough light so that they can be clearly reproduced. This creates a very sharply defined image which can be sent to a display CRT or processed in various ways.

Embodiments of the present invention are many. The first embodiment described below is for a transparency scanner. This device can be combined with a video effects generator to provide a home video production unit.

The present invention can also be embodied as an x-ray viewer, a microfiche reader, an overhead projector, a microscope, a home video game or information storage unit, an eyeblink triggered pointing device, and a computer interface.

The scanning system of the present invention allows fairly complex optical devices to be manufactured for a fraction of their current cost, yet the devices utilizing the present invention retain equal, and in most cases superior, performance.

These and other objects and advantages will become apparent to those skilled in the art in view of the description of the best presently known mode of carrying out the invention and the industrial applicability of the preferred embodiments as described herein and as illustrated in the drawings.

DETAILED DESCRIPTION OF PREFERRED EMBODIMENTS

Figure 1:
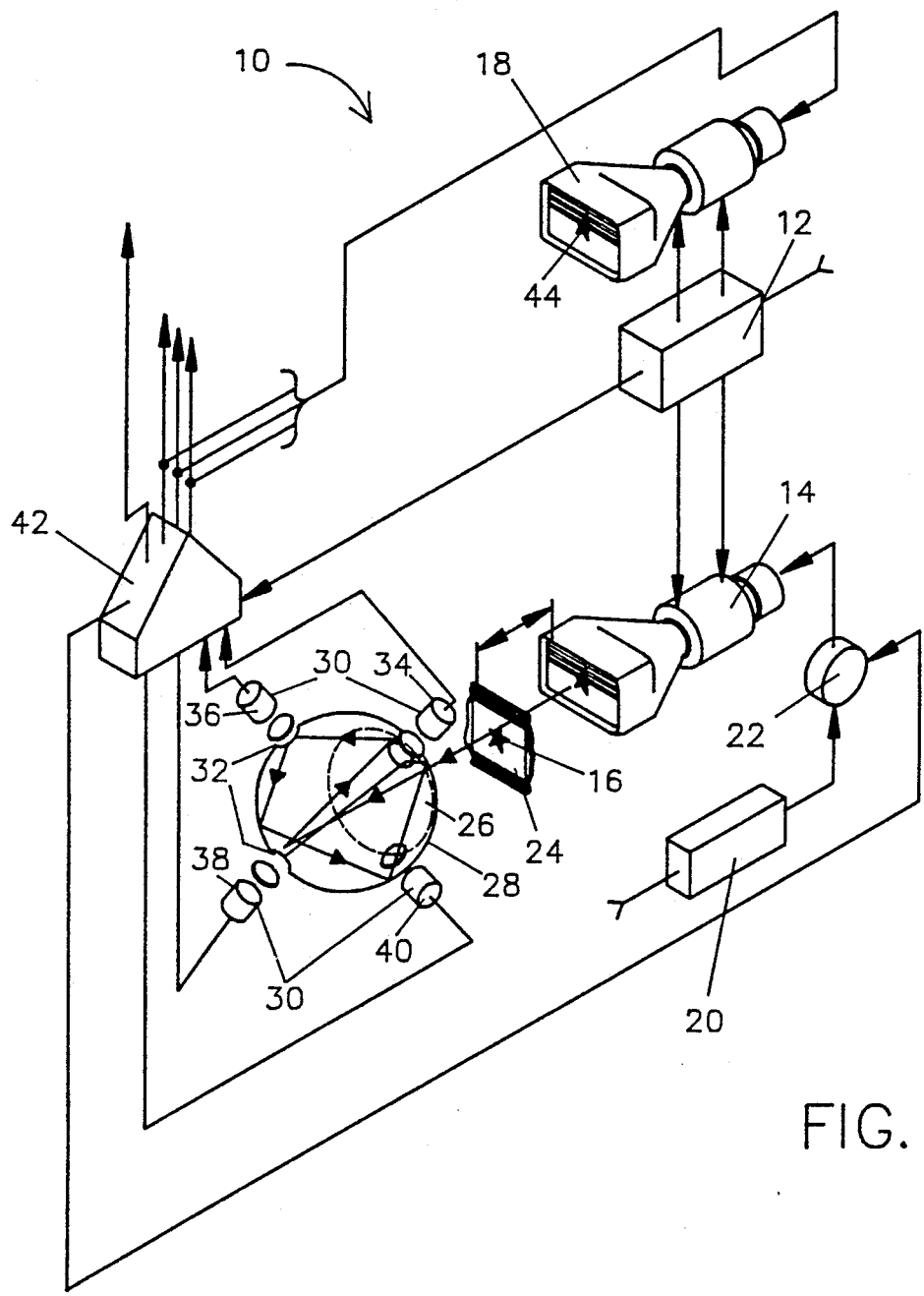
FIG. 1 is a generalized schematic view of an transparency scanning system utilizing an integrated scanning circuit.

A preferred embodiment of the present invention is a transparency scanning system 10 utilizing an integrated scanning circuit 12 as shown in FIG. 1. The circuit 12 drives a monochrome scanning CRT 14 and displays the subject image 16 on a display CRT 18. The display CRT 18 will generally be a color CRT, although a monochrome CRT could certainly be used if desired.

The process is initiated by a white level circuit 20 generating a reference signal. The white level reference signal passes through a mixer 22 to the gun of the scanning CRT 14. The beam of the gun of the scanning CRT 14 is controlled by the scanning circuit 12 and the CRT 14 coils.

The scanning CRT 14 emits white light which passes through a transparent medium 24 containing the subject image 16, in this case a star. The properties of the light are changed depending upon the color and density of the region of the image 16 through which the light passes.

The light, now having characteristics established by its passing through the transparency 24, enters an inlet pupil 26 of an integrating sphere 28. The purpose of the integrating sphere 28, well known to those skilled in the art, is to uniformly disperse the light so that it is homogeneous throughout the sphere 28. This means that a first detector placed anywhere on the sphere 28 would detect light identical to that detected by a second detector placed at any other site on the sphere 28. This uniform dispersal is essential so that all detectors "see" the same image. This makes possible a true replication of the subject image 16.

The integrating sphere 28 is necessary only if multiple detectors are being used, i.e. when a color display is desired. If a monochrome display is desired, only a single detector is required, and it can be placed directly in line with the light emitted from the scanning CRT 14.

To obtain a color display of the subject image 16, four detectors 30 are placed in outlet pupils 32 in the integrating sphere 28. A first detector 34 analyzes the light in the sphere 28 after it is passed through a red filter. Similarly, a second detector 36 analyzes the light after it is passed through a green filter, and a third detector 38 analyzes the light after it is passed through a blue filter. A fourth detector 40 analyzes the light directly for luminance only, i.e. a black and white image.

The signals from the detectors 30 are transmitted to an NTSC video circuit 40 internal to the scanning CRT 14. The function of the NTSC video circuit 40 is well known to those skilled in the art. Its output includes both a standard black and white signal as well as a red/green/blue signal for color monitors.

The black and white portion of the NTSC video feed (the luminance) is then fed to the mixer 22 which controls the signal delivered to the gun of the scanning CRT 14. Thus, a feedback loop to the gun of the scanning CRT 14 is established.

Three things result from the feedback received by the mixer 22 from the luminance signal: (1) The signal to the gun of the scanning CRT 14 may be strengthened or weakened depending on the density of the image 16 on the medium 24. (2) A crisply defined display of the image 16 will appear on the face of the scanning CRT 14. (3) Density information from the image 16 is preserved because, due to the strengthening or weakening of the signal dependant on the density of the image 16, the medium 24 is not saturated by the light from the scanning CRT 14.

The sharp definition of the edges of a displayed image 44 is due to the constant feedback actively turning the intensity of the scanning CRT 14 up or down to exactly reflect the amount of light passed through the medium 24.

The use of the feedback loop has the further effect of allowing non-contact scanning of the subject image 16. So long as the transparent medium 24 is within the range of the scanning CRT 14 (approximately ⅛ inch), the device 10 will function properly. Thus, the need for any precision calibration of the components of the system is eliminated. This results in a huge savings in cost, as well as providing greater ease of operation. (The circuitry of the primary scanning loop is described in detail below.)

A second scanning function, synchronous with the first, provides a separate, high quality display of the image 16 on the display CRT 18. The display scanning loop is created by feeding the NTSC video output to the display CRT 18. The second loop also includes the same scanning circuit 12 that controls the scanning CRT 14. Thus, synchronization of the two functions, scanning and display, is controlled by the same synchronization and scanning circuit 12.

Figure 2:
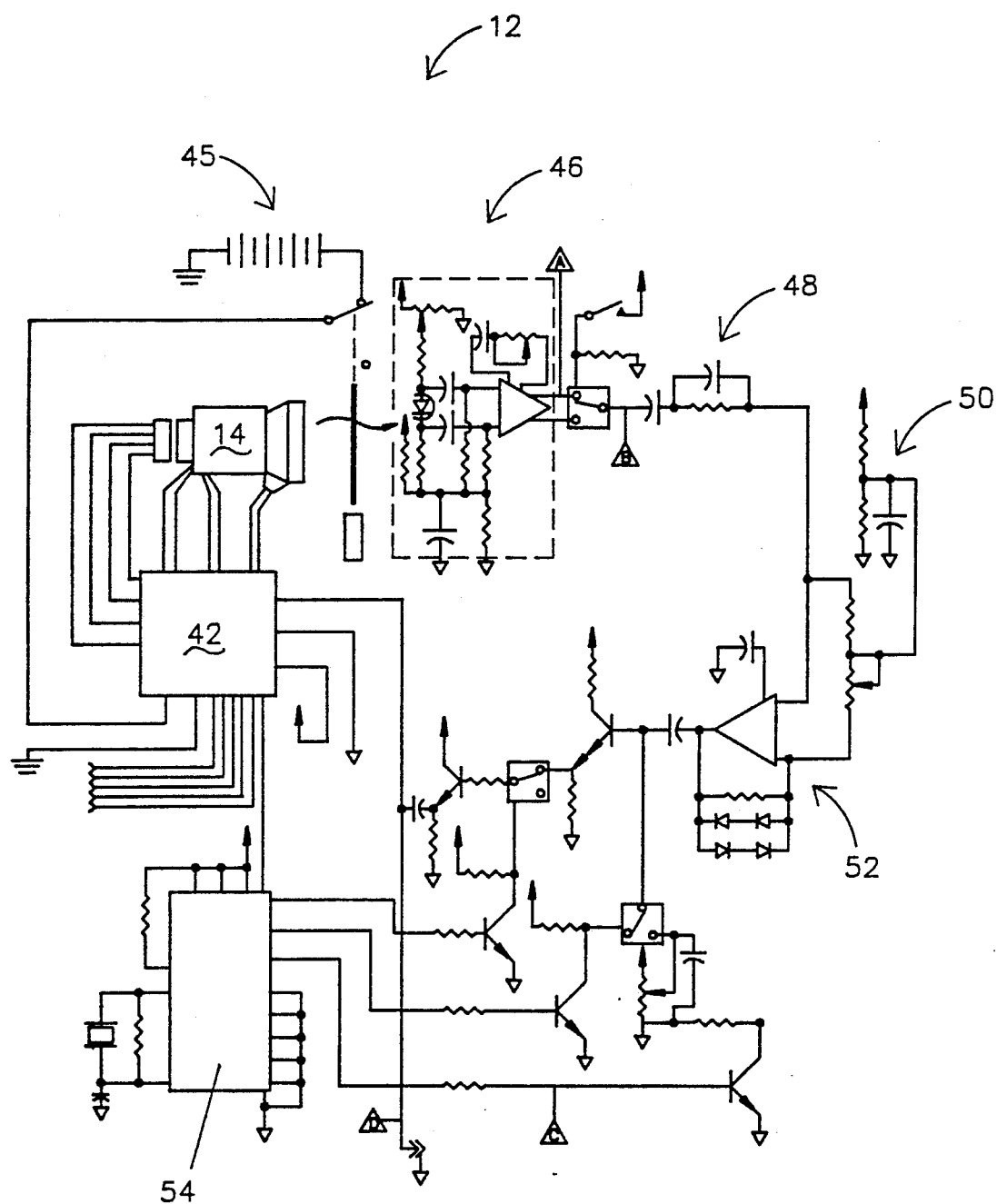
FIG. 2 is a schematic representation of the circuitry of the present invention.

The circuitry required for the imaging feedback loop described above is shown in detail in FIG. 2. The device is powered by batteries 45. The pre-amp portion 46 of the circuit is a common video speed op-amp. The signals received from the detectors 30 are differentially sampled, decoupled, and amplified. The op-amp 46 has both positive and negative outputs, for true or inverted video signals (at point A). Thus the user, by selecting the proper output, can convert a negative to a positive image, positive to negative, or leave the type of image unchanged.

The signal then passes through decoupling means 48, bias balancing means 50, and an amplifier 52. The amplifier 52 also corrects some of the non-linearity of the circuit. The signal then enters the mixer 22 portion of the circuit where the sync pulse and the black level information is added. The sync pulse and black level information is provided by a timing generator chip 54, a standard video item. The chip 54 generates all of the horizontal and vertical sync information required to properly display an image. The black level information is necessary to ensure that the grey scale is reproduced accurately. The default white level of the CRT 14 is controlled internally in the NTSC video circuit 40.

The output of the mixer 22 portion of the circuit is standard NTSC black and white composite video, and is fed directly to the NTSC video circuit 42 of the scanning CRT 14 to complete the feedback loop.

The function of the circuit as described above is to improve the resolution of the image displayed. Without the real time feedback, the displayed image would be of very poor quality.

Figure 3:
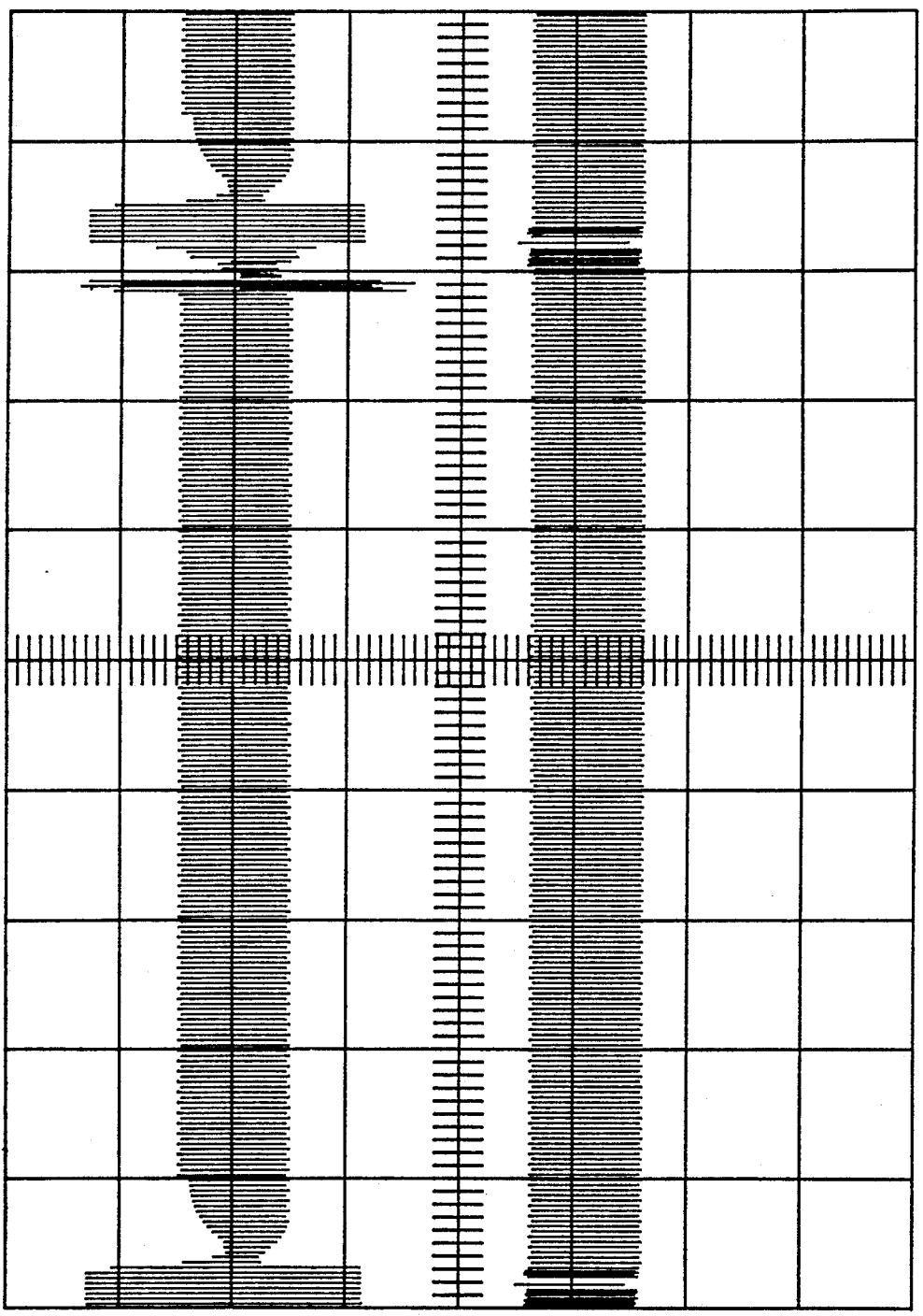
FIG. 3 and FIG. 4 are examples of waveforms at indicated points in the circuit.
Figure 4:
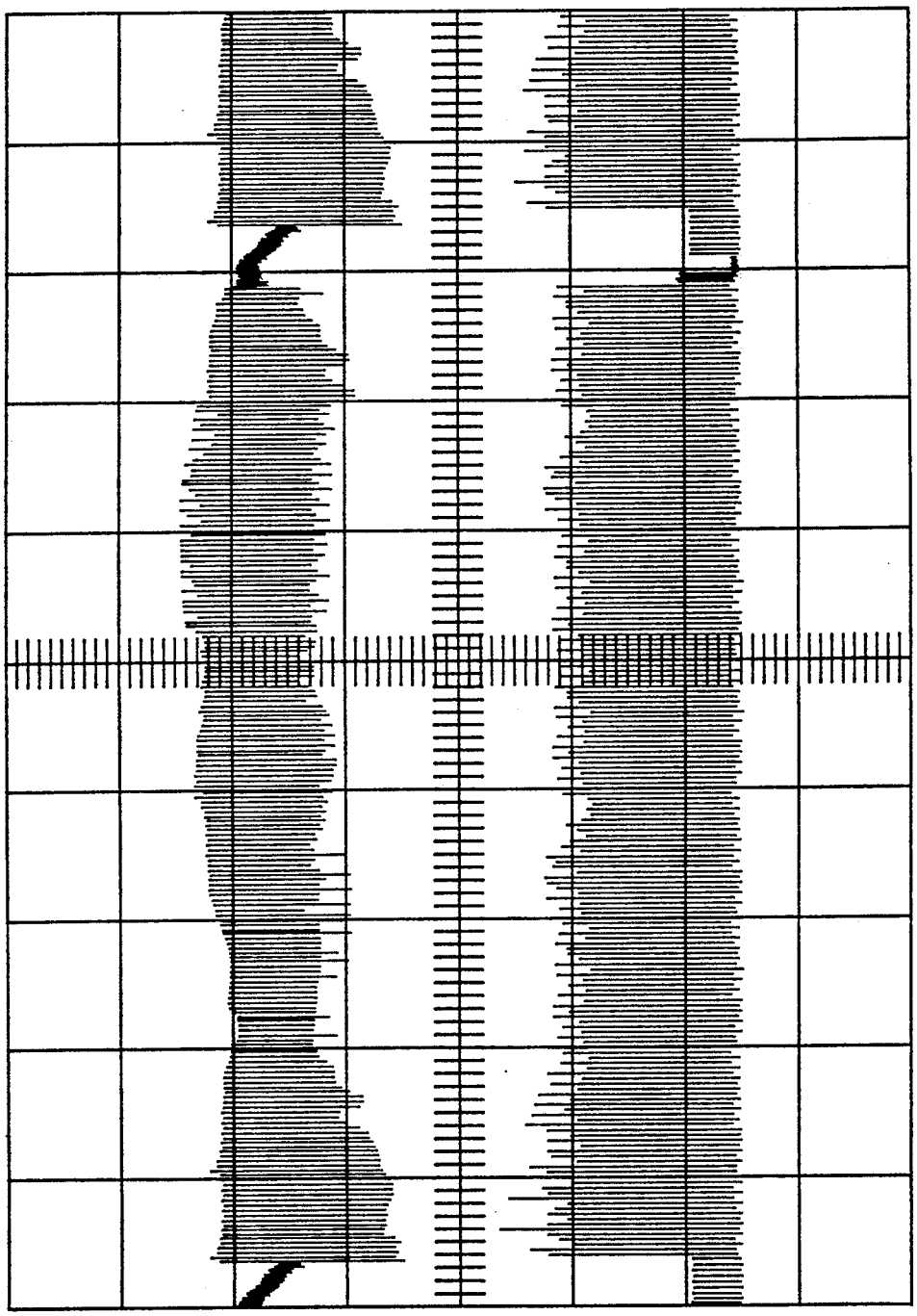

FIGS. 3 and 4 display waveforms of the signal at indicated points in the circuit. Waveform A (FIG. 3) is the pre-amplified output of the scanning CRT 14 when no image 16 is being scanned, i.e. the signal for a blank white display. Waveform B (FIG. 4) is the signal when an image has been scanned, each vertical pulse being a raster line of the image. The dead band (blank area in the waveform) is the segment of the signal where the sync pulse and the clamp (also establishing the black level) are added. Waveform C (FIG. 3) is the inverted sync pulse. Waveform D (FIG. 4) is the output of the scanning system. It is the image as scanned with the sync pulse and clamp added.

In the embodiments described below, those elements common to embodiments described earlier will retain the same designating number, added to a multiple of one hundred. For example, the scanning CRT will be 14, 114, 214, etc. throughout the descriptions of the various devices.

Transparency Scanner

Figure 5:
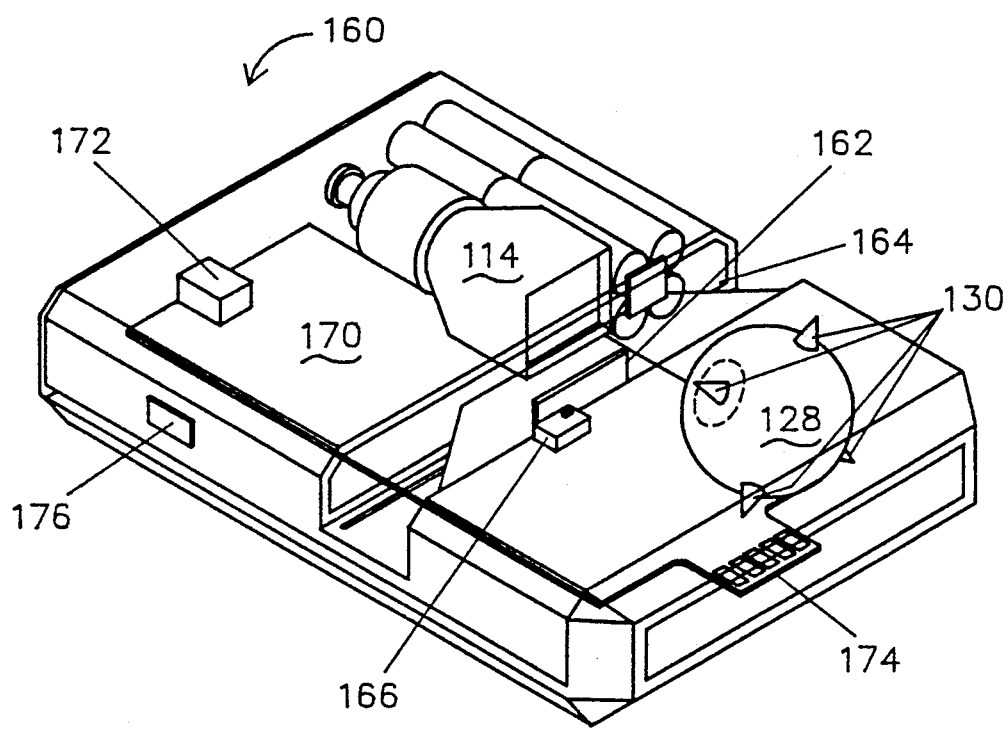
FIG. 5 is a perspective view of the transparency scanner of the present invention with the interior components shown as if the top of the scanner were transparent.

One embodiment of the transparency scanning system 10 is the transparency scanner 160 shown in FIG. 5. It is envisioned that the scanner 160 will be used with photographic films.

The scanner 160 has a size adjustment means 162 to allow the device to handle various sizes of transparent media. In this embodiment, the size adjustment means 162 is simply a spring loaded plate that is depressed when a transparency is inserted into a slot 164. The size adjustment means 162 contacts a transparency sensor 166 which activates the scanner 160. Since the size adjustment 162 is spring loaded, the necessary contact will occur for various sizes of media, while still allowing the transparency to be properly aligned with the scanning CRT 114.

The transparency is scanned by the scanning CRT 114. The light from the CRT 114 is diffused in the integrating sphere 128 and a signal is then generated by the detectors 130.

That signal is processed as described above. The processing circuitry is contained on a PCB (Printed Circuit Board) 170. The PCB 170 is equipped with an outlet jack 172 to provide a connection for the display CRT (not shown).

The scanner 160 is also equipped with an effects controller connector 174. The effects controller is a device (described below), which allows the user to add various video effects to the subject image.

The scanner 160 is further equipped with a positive/negative switch 176. The switch 176 is connected to the op-amp acting as a pre-amp for the video output. The op-amp (at point A in FIG. 2) has both positive and negative outputs, for true or inverted video signals. Thus the user, by selecting the proper output, can convert a negative to a positive image, positive to negative, or leave the type of image unchanged.

Video Effects Generator

Figure 6A:
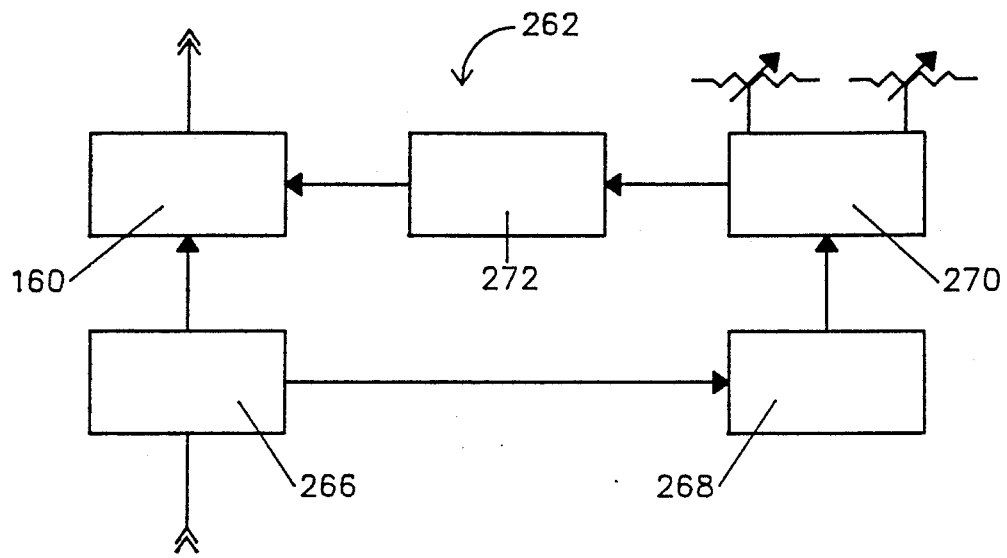
FIGS. 6A and 6B show the schematic representation of the video effects generator of the present invention.
Figure 6B:
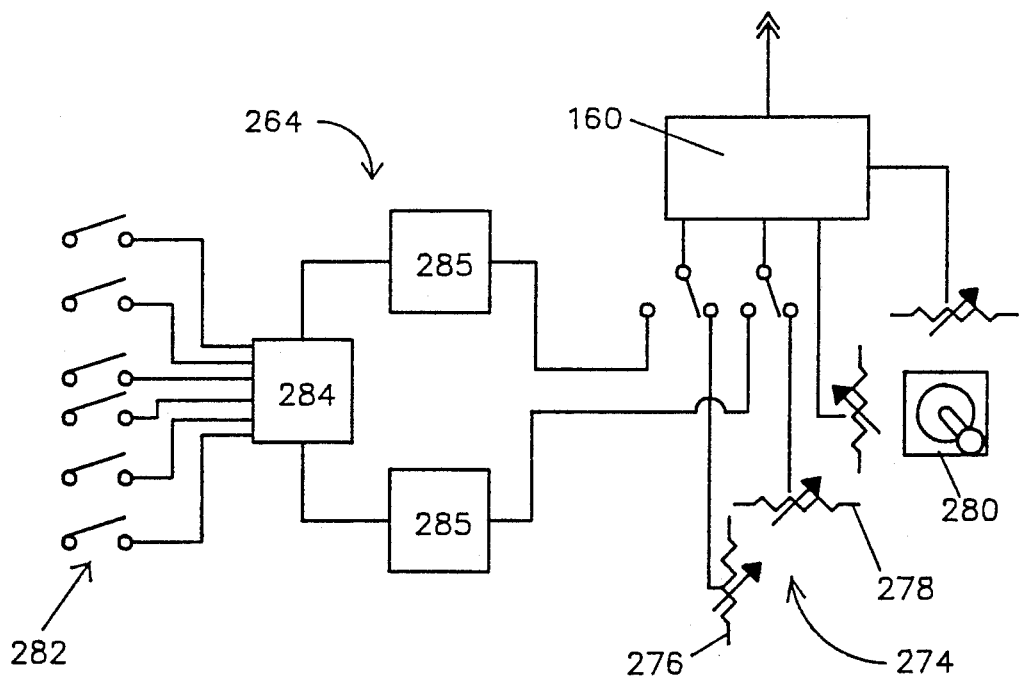
Figure 7A:
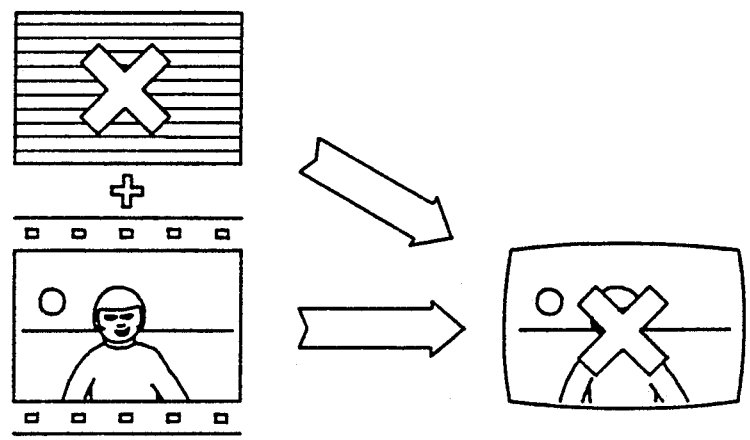
FIGS. 7A-C and FIGS. 8A-C demonstrate some of the video effects possible with the present invention.
Figure 7B:
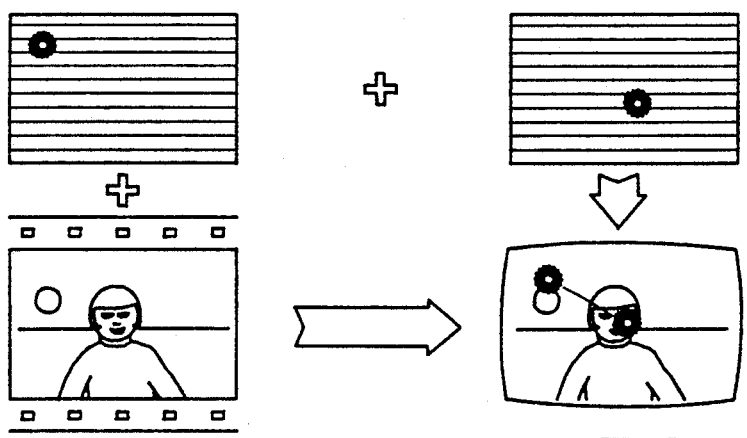
Figure 7C:
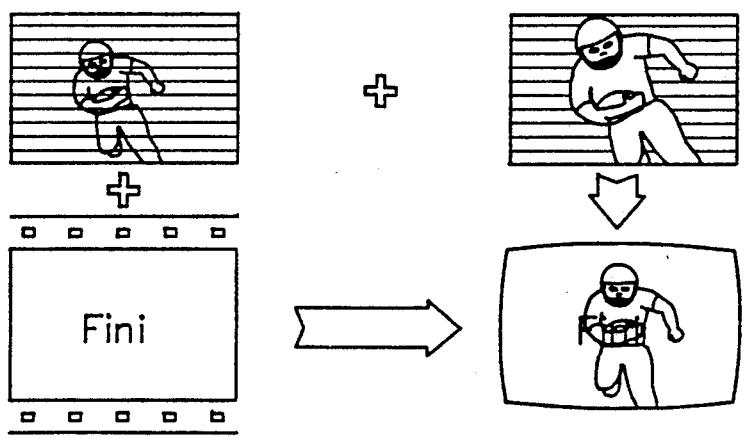

FIGS. 6A and 6B show the components of the video effects generator 261. The video effects generator 261 is a device designed to be used in conjunction with the transparency scanner 160. The addition of the effects generator 261 adds three additional functions to the scanner 160: (1) The ability to crop (zoom) and to move (fly) the cropped field to other portions of the display screen. (2) To modify the scan raster pattern to deliberately distort the image. (3) To mix video from any compatible source to create new images.

The video effects generator 261 contains two major circuitry elements, the title keyer 262 and the crop/move/effects controller 264. The title keyer 262 (FIG. 6A) has a standard video equipment configuration. An exterior video input signal passes through the sync strip circuit 266, where the exterior sync is removed. The stripped signal is sent directly to the scanning circuit of the display so that the exterior signal and the signal generated by the scanner 260 are synchronized.

The stripped exterior video signal is processed through an adder 268 and a colorizer 270. These elements control the priority of signals, i.e. whether the exterior video signal will be dominant or recessive when mixed with the image being displayed by the scanner 160. (A dominant signal appears as superimposed over a recessive signal.) Finally, the keyer 272 can be used to extract certain information from the exterior video signal. The resulting signal is then synchronously added to the signal generated by the scanner 160, and the combined images are displayed. The title keyer 262 enables the user to combine two video signals, manipulate the color content of the picture, or eliminate certain intensities or colors from the picture completely.

A diagram of the crop/move/effects controller 264 is shown in FIG. 6B. It can be used in conjunction with the title keyer 262 or separately. The function of the crop/move/effects controller 264 is essentially to control the size, position, and shape of the scan raster.

A crop control 274 provides an x-axis scan size adjustment means 276 and a y-axis scan size adjustment means 278. The crop control 274 simply changes the size of the scanning raster. This allows a "zoom" effect to be created. The scanning raster size is reduced to scan the subject image, but is displayed at full size.

A joystick 280 (which operates a potentiometer) is provided to enable the user to move the center point around which the scan field is centered. This causes the raster, whatever its size, to move about as controlled by the joystick 280. Thus, any portion of the subject image can be cropped and moved (flown) about the display. Some of the effects that can be created using the video effects generator 261 are illustrated in FIGS. 7A-C and FIGS. 8A-B. Zoom and rotate can be accomplished mechanically by moving the coils of the CRT. This method could be suitable in low cost applications.

Figure 8A:
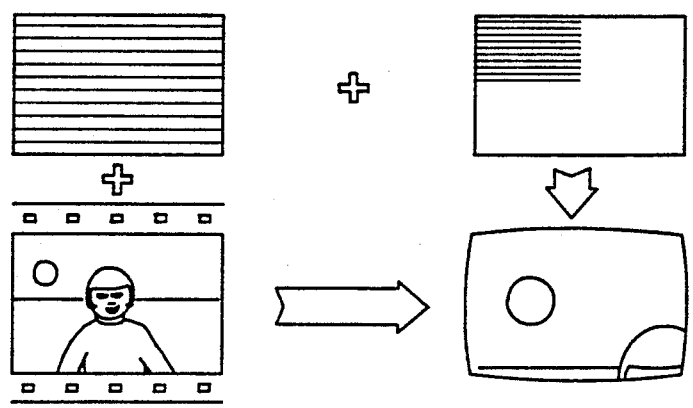
Figure 8B:
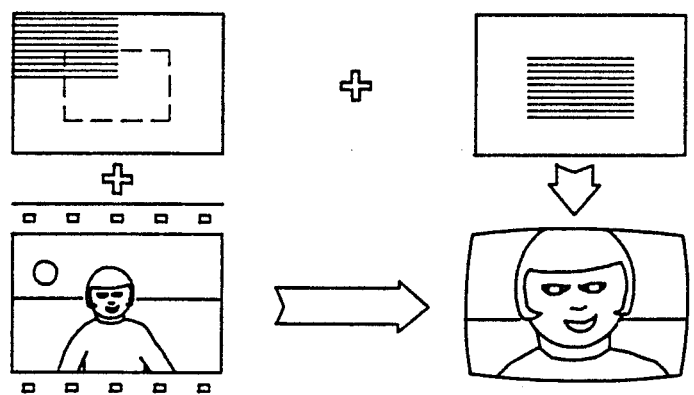
Figure 8C:
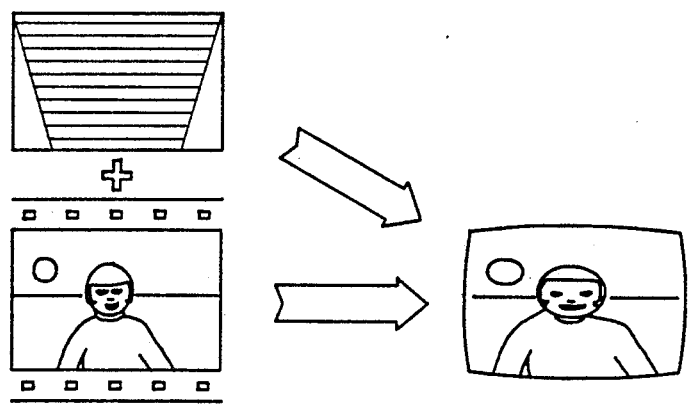

A state selector 282 allows the user to utilize various Amperex Digital Optical type effects (ADO's). A state machine 284 makes the appropriate modification of the raster to achieve the desired effect. Analog/digital convertors 285 then convert the signal to analog form. Some of the available ADO's are: (1) Bowtie. The center of the image is reduced in size. (2) Pseudo-sphere. Display the image as if wrapped around a ball. (3) Keystone. Forces the image into the shape of a keystone. An example of the keystone effect is shown in FIG. 8C. (4)

Corner peel. Creates the effect of the image being peeled off the screen. (5) Center burst. "Explodes" the image.

Figure 9A:
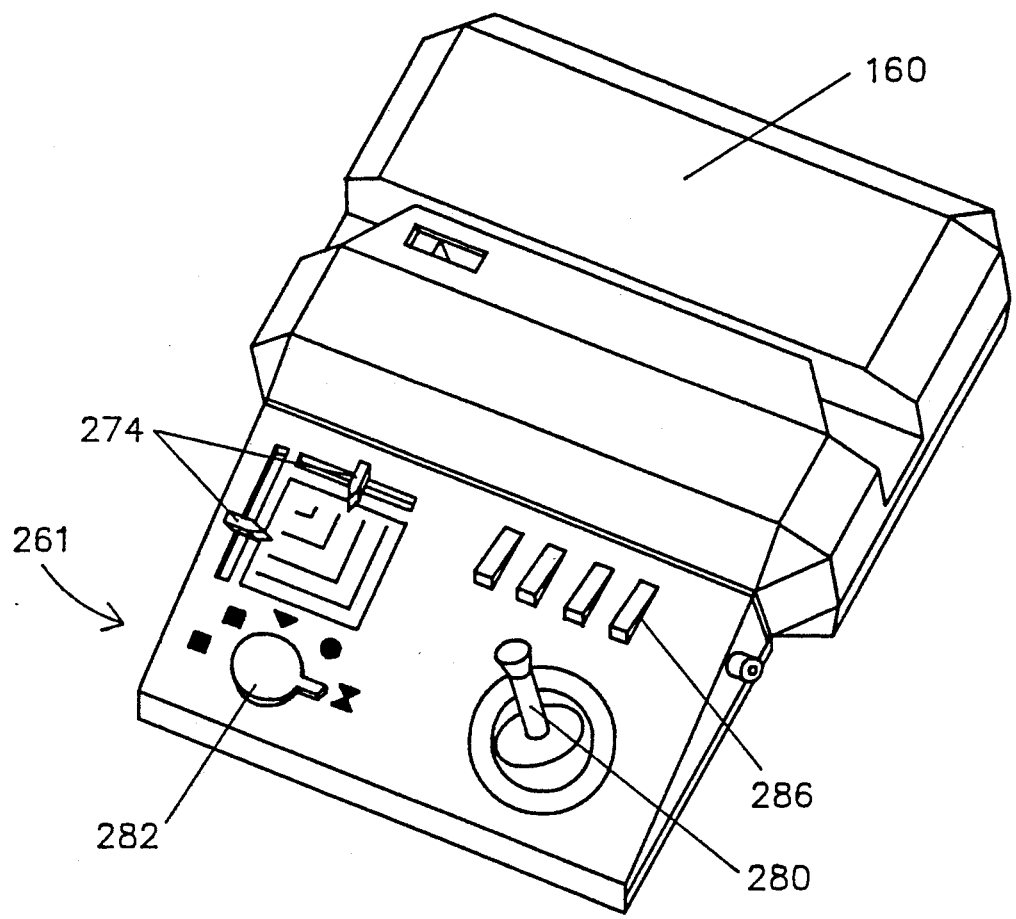
FIG. 9A is a perspective view of the transparency scanner with the video effects generator attached.

FIG. 9A shows a perspective view of the video effects generator 261 connected to the scanner 160. The joystick 280, the crop control 274, the state selector 282, and function selection switches 286 are readily accessible on the exterior of the device. The function selection switches 286 activate the crop, move, effects, and video in functions.

Figure 9B:
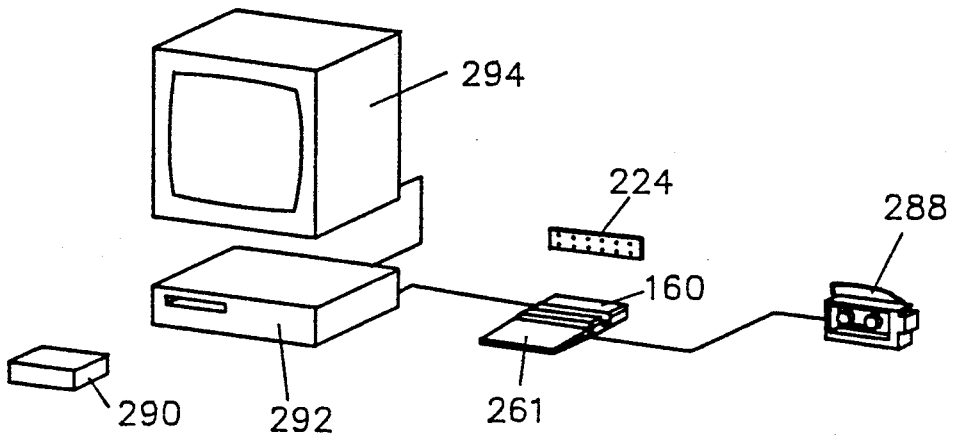
FIG. 9B shows the expected conformation of the scanner and effects generator used in conjunction with a video source and a television.

FIG. 9B shows the expected conformation of the scanner 160/video effects generator 261 in home use. An external video means 288, such as a camcorder, is connected serially with the scanner 160/video effects generator 261 combination. The scanner/effects combination joins the signal from the external video means 288 with the image from a transparent medium 224, performs any desired manipulation, and transmits the signal to be either recorded on a video tape 290 by a VCR 292 or directly displayed on a TV 294.

With this configuration, many video manipulations are possible. The user can archive, to video tape, negatives (as negatives or as positive images) or slides. The negatives or slides can be viewed directly for presentation or review of the contents. Titles and text from transparencies can be combined with moving video as introductory or explanatory material

Medical/Fiche Scanner

Figure 10:
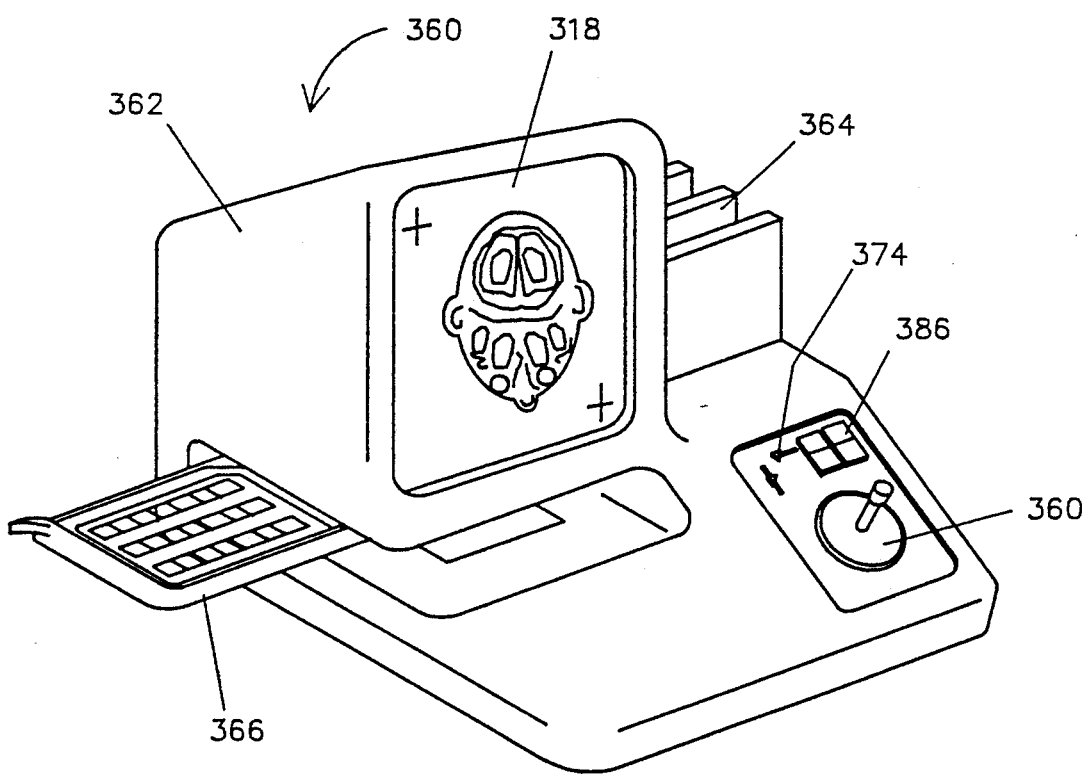
FIG. 10 is a perspective view of a fiche scanner adapted for medical applications.

Another embodiment of the present invention as a medical/fiche scanner 360 is shown in perspective view in FIG. 10. The medical/fiche scanner 360 utilizes the transparency scanning system 10 of the present invention in conjunction with the video effects generator 261 (with ADO's eliminated) to create a form particularly adapted to viewing microfiche. It is envisioned that this embodiment would be particularly useful in the medical field.

The medical/fiche scanner 360 encloses a transparency scanning system 10 in a specialized external housing 362. A media storage area 364 is provided to the side of a display CRT 318. A pivoting media tray 366 moves the media 368 into position above a scanning CRT.

Also visible on the housing 362 are a joystick 380 that controls the positioning of the center of the scan raster, a crop control 374 that controls the size of the raster, and a set of function selection switches 386. It is envisioned that one of the functions available on the medical/fiche scanner 360 is preset levels of magnification (through preset crop levels).

In this embodiment of a medical/fiche scanner 360, the CRT's used would be of higher resolution than normal. The CRT's would have 1200 line resolution with the ability to fly the raster pattern from one page or image to the next.

It is also envisioned that the device could be adapted to provide input to a computer to allow further manipulation and/or analysis.

Overhead Projector

Figure 11:
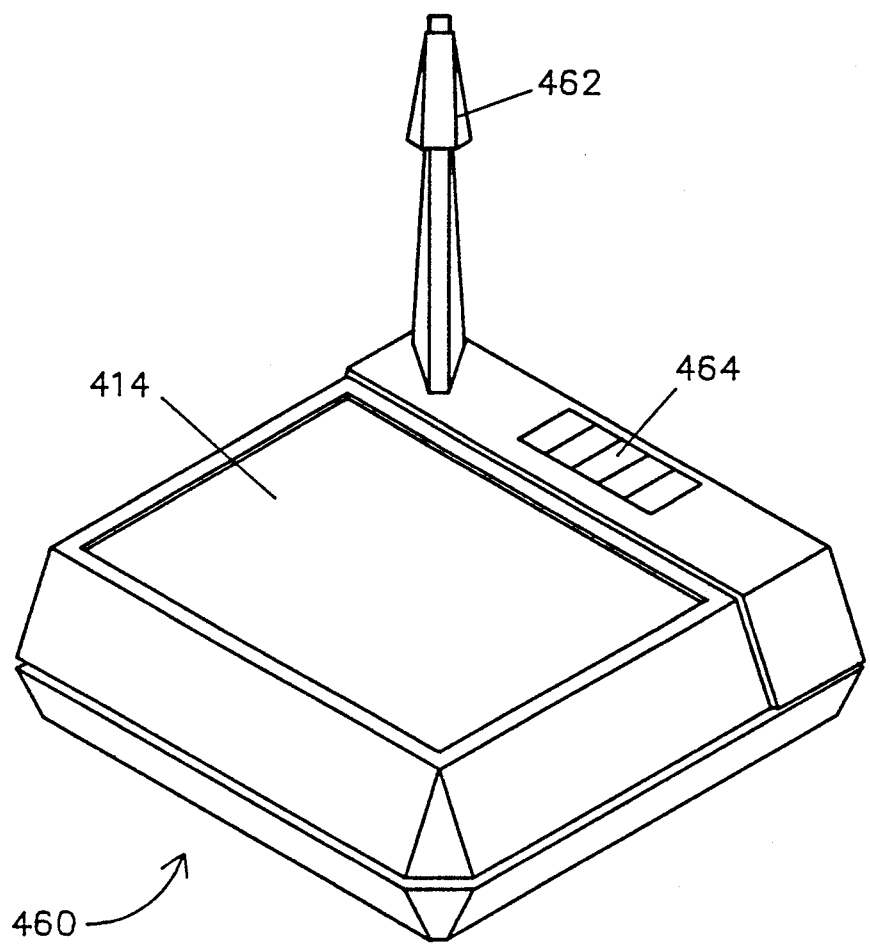
FIG. 11 is a perspective view of an overhead projector utilizing the present invention.

FIG. 11 shows another embodiment of the present invention as an overhead projector 460. In this embodiment, a scanning CRT 414 would take the place of a current art overhead projector's fersenel illumination surface. An integrating sphere contained in an image pickup head 462 would replace the normal optic head. Operation of the projector 460 would be controlled by a set of controls 464.

The image as scanned could be displayed on any number of TV monitors, making this embodiment particularly useful for educational applications.

Microscope

Figure 12:
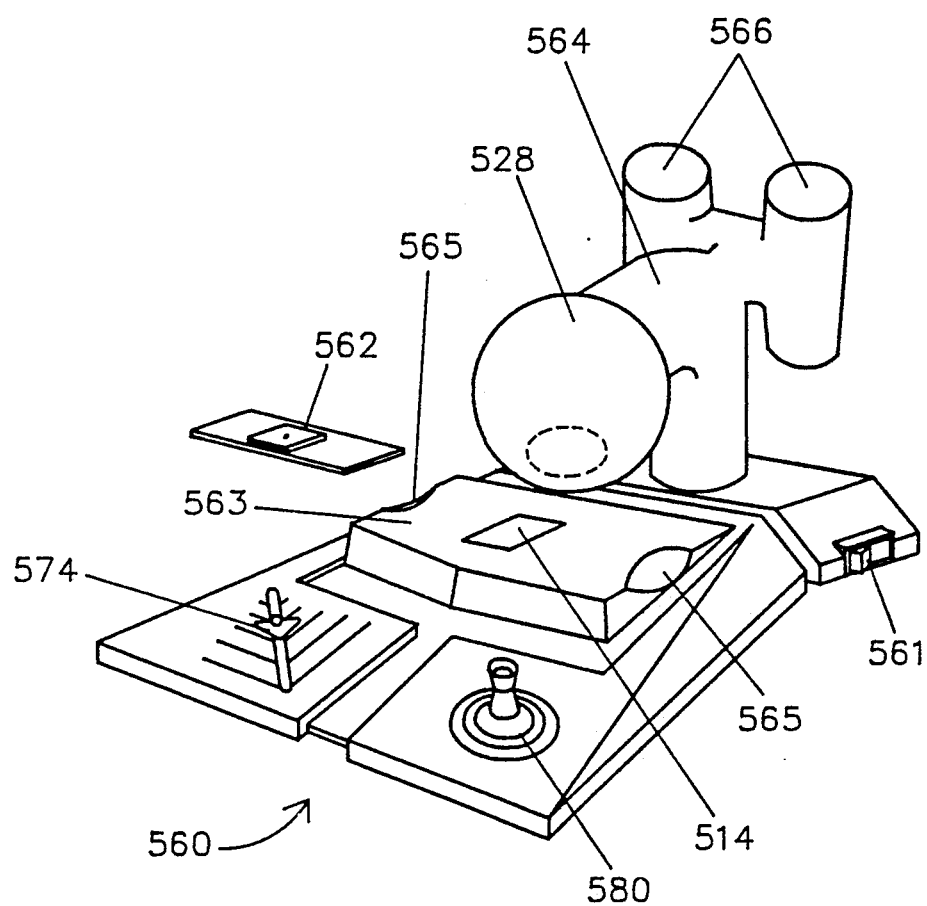
FIG. 12 is a perspective view of a microscope utilizing the present invention.
Figure 12A:
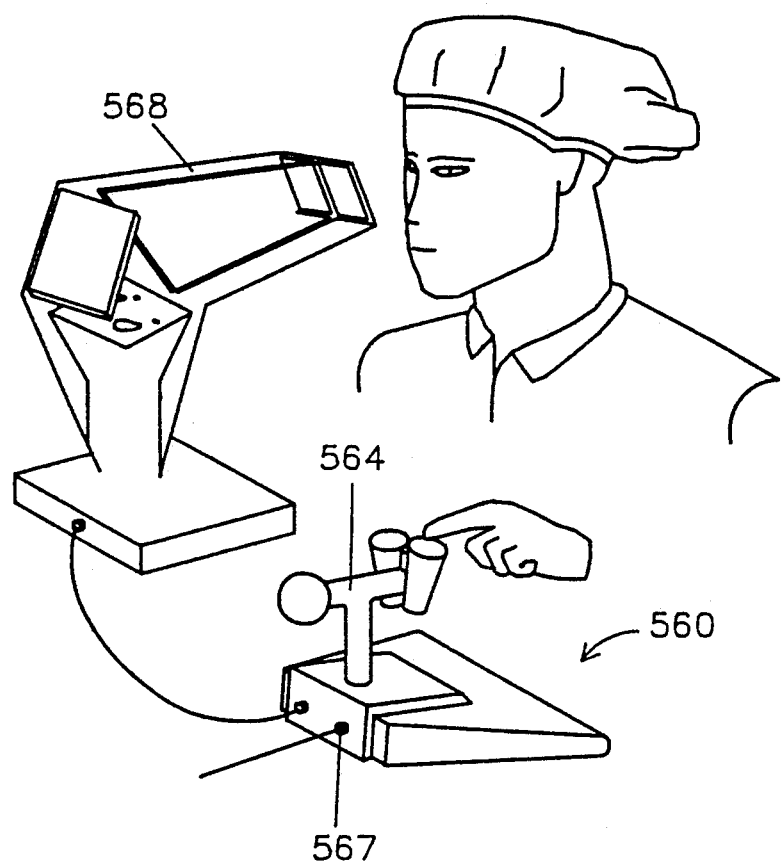
FIG. 12A is a perspective view of a stereo microscope utilizing the present invention.

Another embodiment of the present invention is the microscope 560 shown in FIGS. 12 and 12A. A video effects generator is included so that the image may be manipulated with a crop control 574 (for zoom) and a joystick 580 (for fly). Power to the unit is controlled by an on/off switch 561.

A tiny scanning CRT 514 scans a microscope slide 562 positioned on a fixed stage 563. The stage 563 is equipped with depressions 565 to allow the slide 562 to be easily picked up. An integrating sphere 528 receives the light transmitted through the slide 562. The integrating sphere 528 is mounted on a rotating head 564.

If the user wants to have the microscope function as a stereo microscope, he rotates the head 564 180° so that a set of stereo detectors 566 are brought into alignment with the scanning CRT 514. When the head 564 is rotated, an internal sensing switch (not shown) is activated to enable the appropriate set of circuitry, either for normal perspective or for stereo microscopy.

Each of the detectors 566 contains a single black and white luminance detector. The resulting images are left and right perspective views of the specimen on the slide 562. The images are displayed on two separate screens and viewed through a stereo hood 568.

Magnification is achieved by displaying the images on standard size display CRT's. Further magnification can be achieved by using the crop function of the microscope 560 to focus on a small section of the slide 562. Using this technique, magnification of 600x can be easily attained without degradation of the displayed image.

An advantage of the microscope scanner 560, in addition to the elimination of the optical hardware, is that it can be simultaneously viewed by a group, making it an excellent teaching tool.

A further advantage is that no focusing is required, thus eliminating the possibility of destroying the lens and/or specimen as is common with current art microscopes in which a mechanical stage is moved. In fact, since the microscope has the crop and fly capabilities to enable isolation of any portion of the slide 562 within the field of the scanning CRT 514, the need for a moveable stage is completely eliminated.

The output of the microscope 560 can be stored on video tape or used as input to a computer via transmission means 567. The microscope 560 can also be used with various filters or polarizers.

Home Video Game/Fiche Scanner

Figure 13:
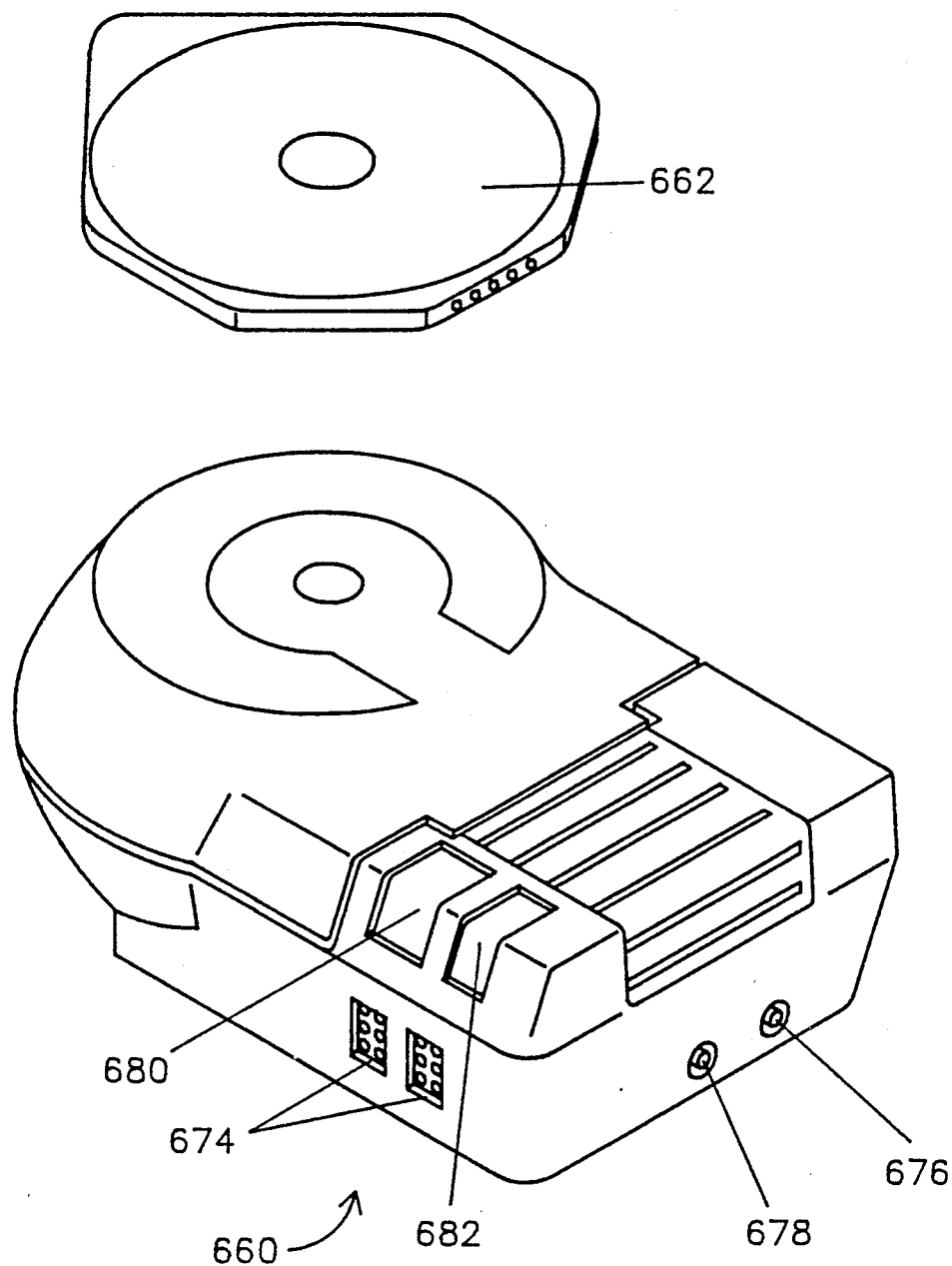
FIG. 13 is a perspective view of a home video game/fiche scanner.
Figure 14:
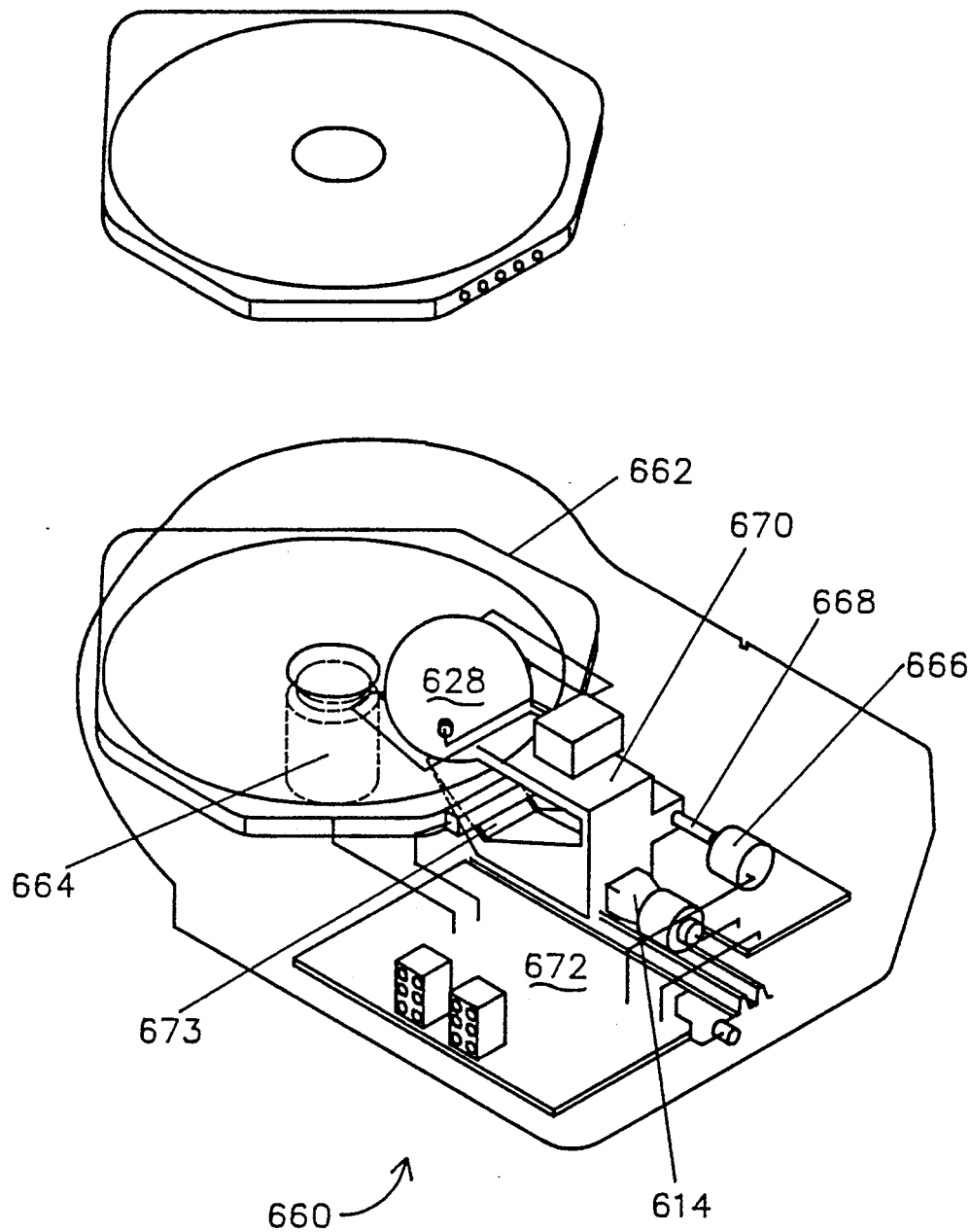
FIG. 14 is a perspective view of the interior of a home video game/fiche scanner.

An inexpensive video game/fiche scanner 660 is shown in FIGS. 13 and 14. The mechanical configuration of the device is similar to that of a head/disk assembly in a computer. Any known method of providing information to the scanner 660 will suffice. In this embodiment, the information is supplied via a removable film disk 662.

The accessing of information stored on the film disk 662 is controlled by two motors, a first motor 664 that spins the film 662, and a scanner/servo motor 666 that, with a lead screw 668, controls the positioning of the scanning assembly 670. A computer board 672 controls the operation of the two motors 664 and 666. The computer board 672 derives the positioning information from a ROM (Read Only Memory) imbedded in the frame of the film 662.

When the disk 662 is in the proper position, a scanning CRT 614 reflects light off a mirror 673 so that the light passes through the video disk 662. The light is received by an integrating sphere 628 and processed in the manner of the present invention.

FIG. 14 shows the external appearance of the video game/fiche scanner 660. The unit is supplied with two control inputs 674 to enable the user to select control by keyboard or joystick The scanner 660 also has a video input 676 and an audio input 678. It is equipped with an on/off switch 680 and a reset button 682.

The data stored on the film disk 662 can be either pictorial or verbiage. If the data is text, the device would be used as a fiche scanner, enabling the user to establish a home dictionary or other text sources. If the data is pictorial, it can be either simply storage of the user's pictures, or the background for video games.

When the scanner 660 is being used in a game mode, the background video is supplied by the disk 662. Using the techniques for the video effects generator 261 previously disclosed in this application, the scanner 660 can distort the picture, zoom, fly, or add graphics. Note too that the background provided could be actual terrain. For instance, there could be games involving specific countries or regions. Further, any particular area of interest could be filmed by the user.

The computer 672 supplies the small areas of active graphics. This frees the scanner 660 to apply its capacities to the animation of "sprites" (e.g. cars, people, planes, etc.). The scanning circuitry would also detect collisions of the sprites with each other or with other objects and control the effects of these collisions.

Video Game Interface

Figure 15A:
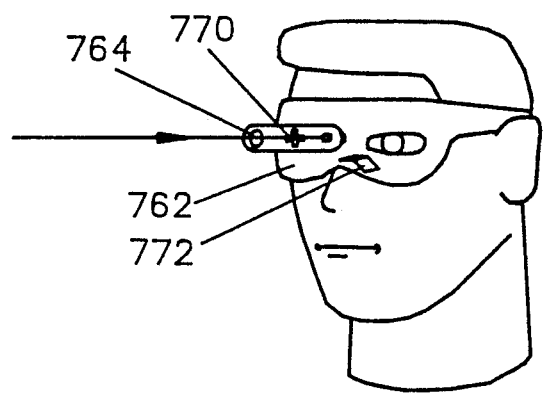
FIGS. 15A-B show a video game interface.
Figure 15B:
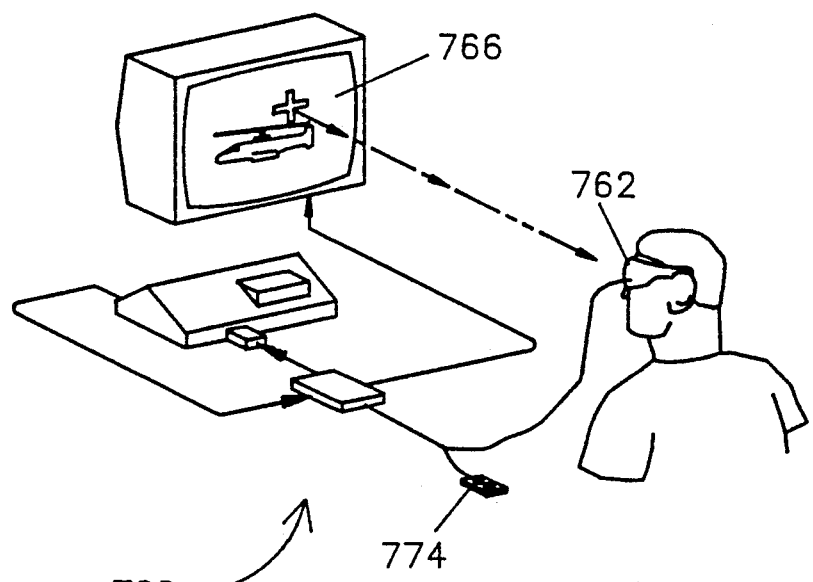

Another embodiment of the present invention is a video game interface 760 as shown in FIGS. 15A–B. The interface 760 includes a pair of glasses 762 equipped with a miniaturized embodiment of the scanning system 10. A lens 764 focuses the light received from the video game display 766. Before the light is sensed by a detector 740, all but a small portion of it is blocked by a screening aperture 770.

The screening aperture 770 is in the shape of a desired marker, such as a cross or a circle. The shape, through the feedback process appears on the screen at the point where the user is directing his line of eyesight. The user can move the marker around the screen simply by moving his head.

When the user has the marker positioned properly, an eyeblink switch 772 (capable of detecting the passage of the eyelid in front of the eyeball) triggers the appropriate action depending on the game, e.g. firing a rocket, torpedo, or the like. An optional additional control 774 may be added if the game is complex enough so that all actions cannot be controlled by the movement of the user's head.

Non-Contact Computer Mouse

Figure 16:
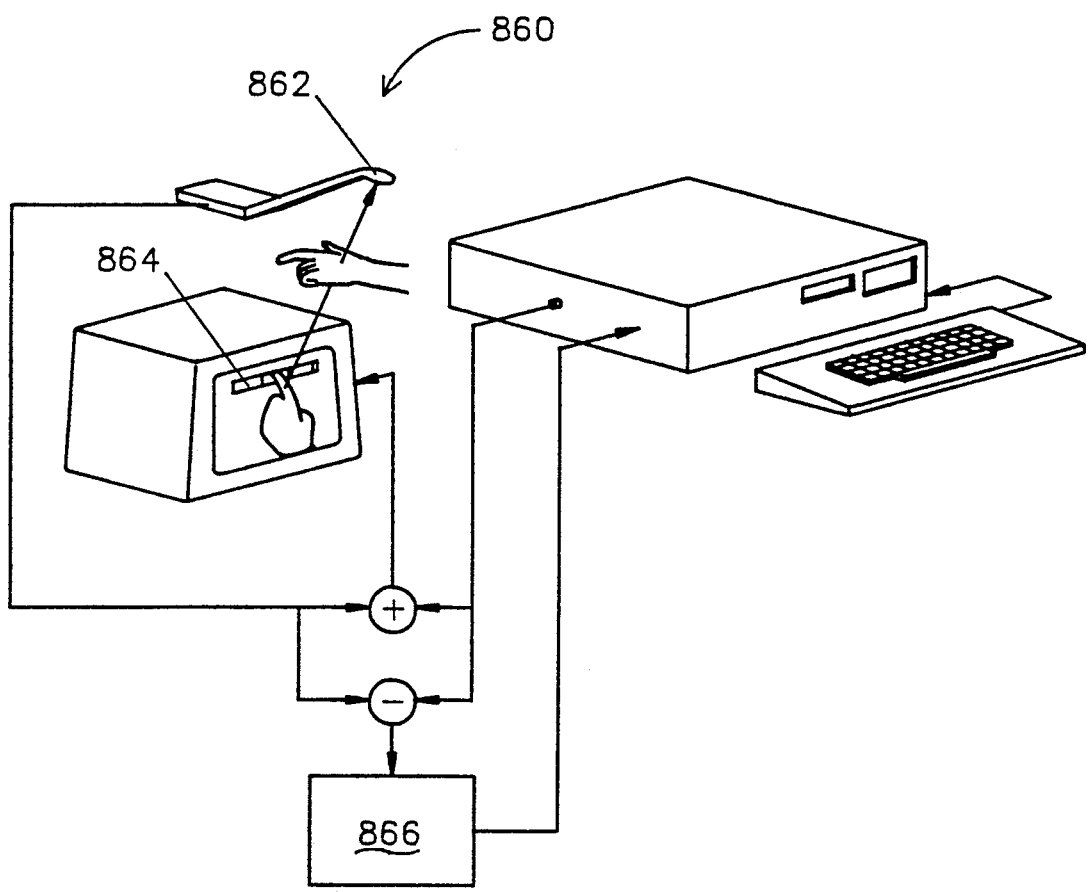
FIG. 16 is a diagram of a non-contact computer mouse.
Figure 17:
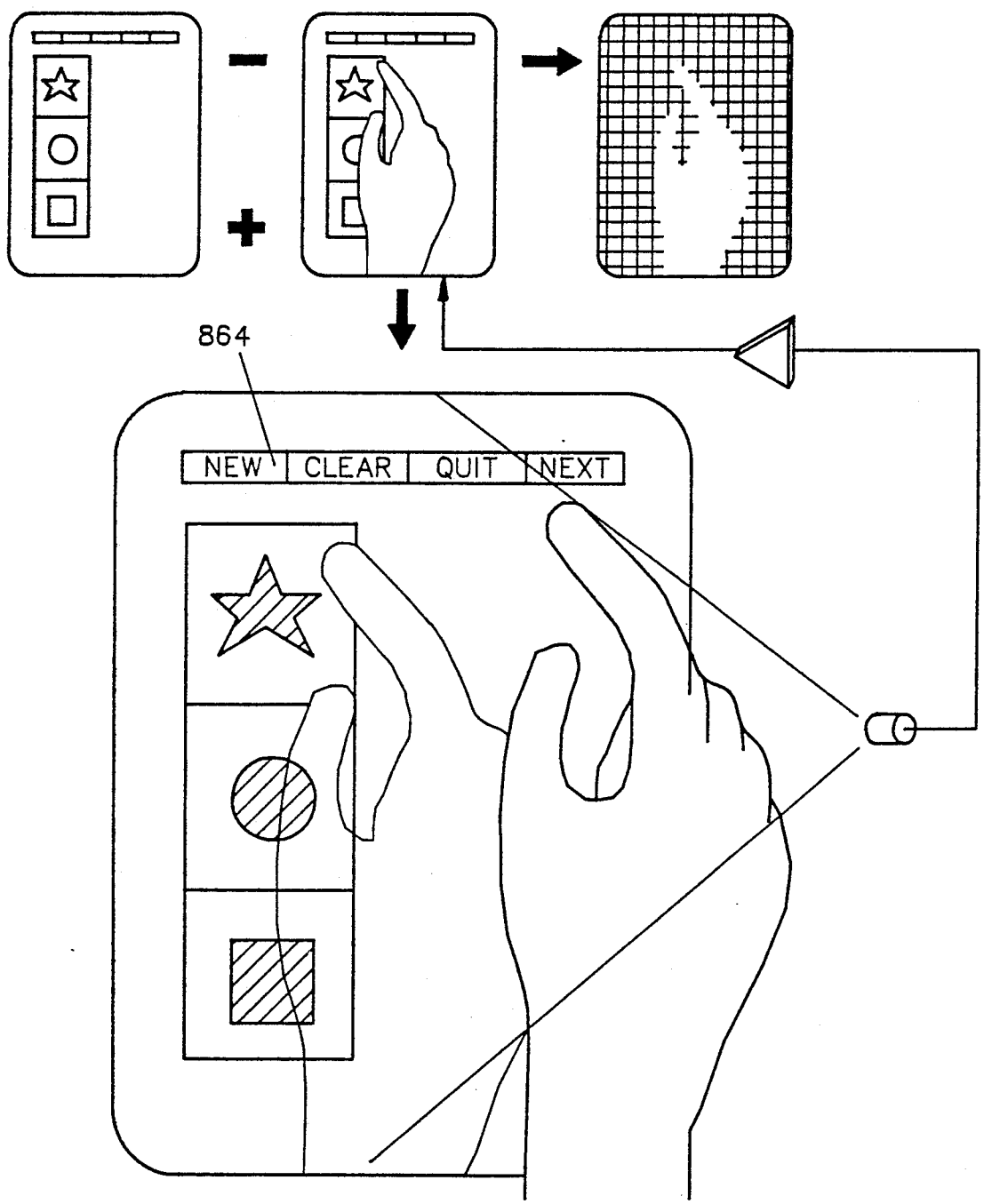
FIG. 17 shows how the computer determines where a user's finger is pointing.
Figure 18:
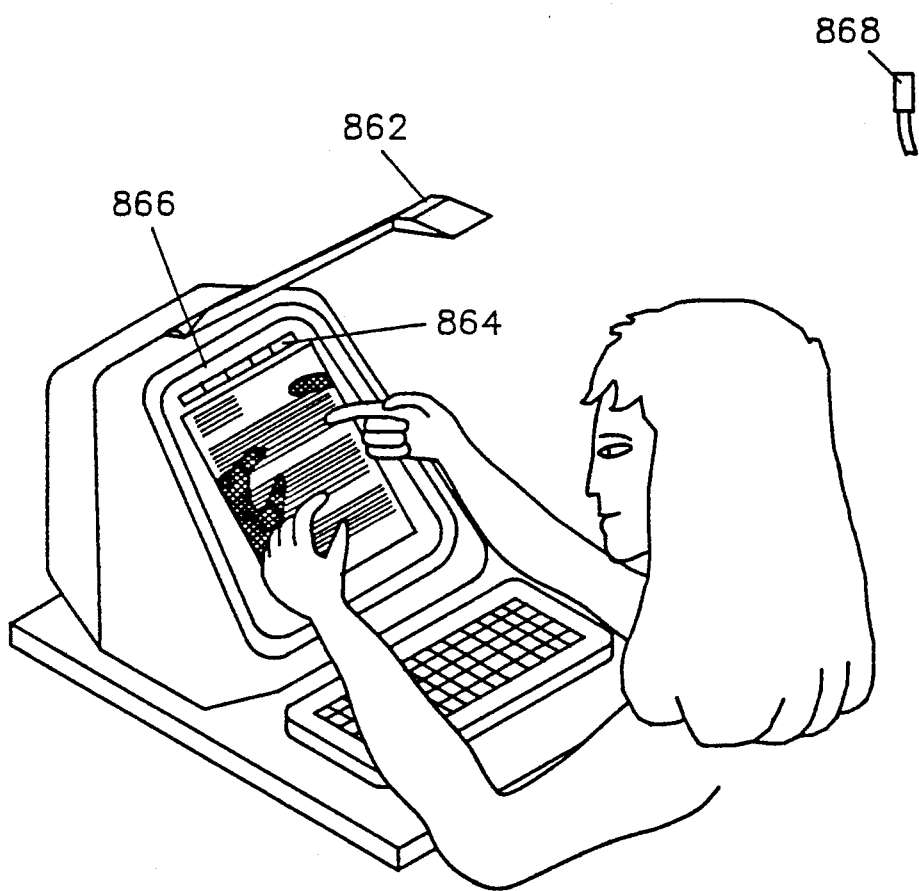
FIG. 18 is a perspective view of a user operating a personal computer equipped with the non-contact mouse.

The present invention can also be embodied as a non-contact computer mouse 860 as shown in FIGS. 16, 17, and 18. The mouse 860 is designed to be adaptable to an ordinary personal computer (PC).

The scanning system 10 of the present invention is combined with a PC to enable the user to perform the functions of a mouse by simply pointing his fingers.

A video pickup 862 is attached to the monitor of the PC. When the user places his hand in front of a command menu 864, an image of the user's hand, created by the feedback loop of the scanning system, is displayed on the monitor.

The signal from the video pickup 862 is added to that of the PC screen, then the overlapping areas are deleted. This allows analysis of the image by software 866 (available for the PC) to determine where the end of the user's finger is located. (See FIG. 17.)

When the point coincides with a command, the appropriate action is taken. Similarly, text manipulation can be achieved by the user simply pointing at the monitor. For example, the user could touch a "block copy" command, then mark the block simply by bracketing the desired text with his fingers, as illustrated in FIG. 18.

INDUSTRIAL APPLICABILITY

It is expected that the present invention will enjoy very high demand in the market place. It allows the manufacture of many video devices at a fraction of the usual cost, and still provides for higher resolution.

In addition to the specific embodiments disclosed above, it is envisioned that the present invention will be used for many other applications as well. Heavy industry applications include shadow inspection equipment, industrial microscopes, and fiche readers. Medical applications include the microscope, x-ray scanners, and file readers. The education industry should find great use for the overhead projector and replacements for slide and motion film projectors.

Further, it is envisioned that the present invention will be embodied as substitute test cameras, as telecines, and to input negatives/slides to computer storage.

In the home, the present invention will also be used for creating video game systems and microfilm files storing any desired information.

The myriad applications and enormous advantages of the present invention leave little doubt that it will enjoy tremendous commercial success.

What is claimed is:

1. A device to scan and display images contained in transparent media (transparencies) comprising:
    integrated scanning means including a feedback loop whereby scanning of an image and regulation of the displayed image can be performed simultaneously without the need for lensatic optics; and NTSC video circuit; and display means.

2. The device of claim 1 wherein:
    an effects generating means is combined with the device to enable the addition of external signals to the signal of the device, as well as enabling the user to alter the image displayed by cropping, flying, and adding various ADO's.

3. The device of claim 1 wherein:
    the device is used in conjunction with a lens, a screening aperture, and a detector mounted on a pair of glasses to enable the user to project an image in the shape of the screening aperture onto the display screen.

4. The device of claim 1 wherein:
    the device is specifically adapted to be used as a microscope by providing a stage to hold slide specimens to be examined and an effects generating means is included with the device to enable the user to crop and fly the image, as well as allowing the addition of external signals to the scanned image of the slide specimen for simultaneous viewing on the display means.

5. The device of claim 4 wherein:
means are provided for transmitting the image as viewed to computer storage for further analysis.

6. The device of claim 4 wherein:
an optional pair of luminance detectors are provided; one of the detectors providing a left perspective view and the other detector providing a right perspective view, the resulting images being viewed on two display CRT's with a stereo hood so that the device acts as a stereo microscope.

7. The device of claim 6 wherein:
means are provided for transmitting the image as viewed to computer storage for further analysis.

8. The device of claim 1 wherein:
a scanning CRT illuminates the transparency; and
detection means receive the light transmitted through the transparency; and
signals from the detection means are passed through processing means and transmitted back to the scanning CRT to control the level of illumination based on the luminance of the light emitted through the transparency, thus causing a reproduction of the transparency to appear on the scanning CRT.

9. The device of claim 8 wherein:
the device is specifically adapted to enable viewing of images on a film disk.

10. The device of claim 8 wherein:
the device is used in conjunction with a lens, a screening aperture, and a detector mounted on a pair of glasses to enable the user to project an image in the shape of the screening aperture onto the display screen.

11. The device of claim 8 wherein:
the device is specifically adapted to a conformation useful for viewing fiche by providing a means for positioning a fiche in front of the scanning CRT, thereby enabling the image on the fiche to be viewed on a display CRT.

12. The device of claim 8 wherein:
the device is specifically adapted to a conformation useful for performing the function of traditional overhead projectors, the scanning means being adapted to scan a transparency positioned on a flat surface, thereby enabling the image on the transparency to be viewed on a display CRT.

13. The device of claim 8 wherein:
the device is specifically adapted to a conformation useful for viewing photographic transparencies by providing a means for positioning a photographic transparency in front of the scanning CRt, thereby enabling the image on the transparency to be viewed on a display CRT.

14. The device of claim 13 wherein:
an effects generating means is combined with the device to enable the addition of external signals to the signal of the device, as well as enabling the user to alter the image displayed by cropping, flying, and adding various ADO's.

15. The device of claim 8 wherein:
the detection means is an integrating sphere.

16. The device of claim 15 wherein:
the integrating sphere is equipped with sufficient detectors so that it can detect light passed through a red filter, light passed through a green filter, light passed through a blue filter, and luminance.

17. The device of claim 16 wherein:
a mixing means adds a black level definition and a sync pulse to the signal fed to the scanning CRT; and
the mixing means is capable of adding an external video signal to the signal of the system.

18. The device of claim 8 wherein:
the device is specifically adapted to be used as a microscope by providing a stage to hold slide specimens to be examined and an effects generating means is included with the device to enable the user to crop and fly the image, as well as allowing the addition of external signals to the scanned image of the slide specimen for simultaneous viewing on the display means.

19. The device of claim 18 wherein:
means are provided for transmitting the image as viewed to computer storage for further analysis.

20. The device of claim 18 wherein:
an optional pair of luminance detectors are provided; one of the detectors providing a left perspective view and the other detector providing a right perspective view, the resulting images being viewed on two display CRT's with a stereo hood so that the device acts as a stereo microscope.

21. The device of claim 20 wherein:
means are provided for transmitting the image as viewed to computer storage for further analysis.

* * * * *